(12) United States Patent
Hibino et al.

(10) Patent No.: US 6,958,180 B2
(45) Date of Patent: Oct. 25, 2005

(54) PHASE CHANGE OPTICAL RECORDING MEDIUM

(75) Inventors: Eiko Hibino, Kanagawa (JP); Hajime Yuzurihara, Kanagawa (JP); Hiroshi Deguchi, Kanagawa (JP); Hiroshi Miura, Kanagawa (JP); Mikiko Abe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 7 days.

(21) Appl. No.: 10/622,658

(22) Filed: Jul. 21, 2003

(65) Prior Publication Data

US 2004/0017768 A1 Jan. 29, 2004

(30) Foreign Application Priority Data

Jul. 22, 2002 (JP) ........................................ 2002-212313

(51) Int. Cl.$^7$ ................................................. B32B 3/02
(52) U.S. Cl. .................... 428/64.1; 428/64.4; 428/64.5; 428/64.6; 430/270.13
(58) Field of Search ............................... 428/64.1, 64.4, 428/64.5, 64.6, 913; 430/270.13

(56) References Cited

U.S. PATENT DOCUMENTS

| | | | |
|---|---|---|---|
| 5,492,794 A | * | 2/1996 | Kawanishi et al. ...... 430/273.1 |
| 5,736,657 A | | 4/1998 | Ide et al. |
| 5,785,828 A | | 7/1998 | Yamada et al. |
| 6,096,398 A | | 8/2000 | Yuzurihara et al. |
| 6,127,016 A | | 10/2000 | Yamada et al. |
| 6,177,167 B1 | | 1/2001 | Yuzurihara et al. |
| 6,280,684 B1 | | 8/2001 | Yamada et al. |
| 6,296,915 B1 | * | 10/2001 | Yusu et al. ................. 428/64.1 |
| 6,319,368 B1 | | 11/2001 | Ide et al. |
| 6,352,753 B2 | * | 3/2002 | Nonaka et al. ............ 428/64.1 |
| 6,383,595 B1 | | 5/2002 | Hirotsune et al. |
| 6,391,417 B1 | | 5/2002 | Yuzurihara et al. |
| 6,426,936 B1 | | 7/2002 | Shinotsuka et al. |
| 6,479,121 B1 | | 11/2002 | Miura et al. |
| 6,548,137 B2 | | 4/2003 | Ito et al. |
| 6,761,950 B2 | * | 7/2004 | Kojima et al. ............. 428/64.1 |
| 2001/0041240 A1 | | 11/2001 | Ito et al. |
| 2001/0041304 A1 | | 11/2001 | Uno et al. |
| 2002/0098445 A1 | | 7/2002 | Harigaya et al. |
| 2002/0110063 A1 | | 8/2002 | Yamada et al. |
| 2002/0145963 A1 | | 10/2002 | Narumi et al. |
| 2002/0155248 A1 | | 10/2002 | Ito et al. |
| 2002/0160306 A1 | | 10/2002 | Hanaoka et al. |
| 2003/0003395 A1 | | 1/2003 | Yuzurihara et al. |
| 2003/0012917 A1 | | 1/2003 | Harigaya et al. |
| 2004/0121261 A1 | * | 6/2004 | Ashida et al. ......... 430/270.13 |

FOREIGN PATENT DOCUMENTS

| EP | 1 150 288 A2 | 10/2001 |
|---|---|---|
| EP | 1 324 326 A1 | 7/2003 |

* cited by examiner

*Primary Examiner*—Elizabeth Mulvaney
(74) *Attorney, Agent, or Firm*—Dickstein Shapiro Morin & Oshinsky LLP

(57) ABSTRACT

A phase change optical recording medium having a wide recording power margin and excellent durability to repetitive recording is disclosed. The medium includes a first protective layer, a recording layer, an interface layer, a second protective layer, and a reflective layer, the layers disposed on a transparent substrate, wherein the interface layer includes a mixture of $ZrO_2$. Preferably, the medium further includes a second interface layer including the mixture of $ZrO_2$ between the first protective layer and the recording layer. In another preferable aspect, the mixture of $ZrO_2$ is represented by the following formula:

$$[(ZrO_2)_{100-\alpha}(X)_\alpha]_\beta(Z)_\gamma(ZnS)_\delta$$

wherein "X" represents an oxide selected from MgO, CaO, $Sc_2O_3$, $Y_2O_3$, and $CeO_2$; "Z" represents an oxide selected from $TiO_2$, $SiO_2$, $Al_2O_3$, MgO, $Ta_2O_5$, and ZnO; "α" is 2–15 mol %; "β" is 40–100 mol %; "γ" is 0–60 mol %; "δ" is 0–60 mol %; and β+γ+δ=100 mol %.

30 Claims, 8 Drawing Sheets

PHASE CHANGE OPTICAL RECORDING MEDIUM

BACKGROUND OF THE INVENTION

1. Field of the Invention

The present invention relates to a phase change optical recording medium.

2. Description of the Related Art

There are two types of optical recording medium on which data can be recorded, reproduced, and deleted by irradiation of a semiconductor laser beam. One is a magneto optical medium on which data are recorded (or written) and deleted (or erased) by reversing magnetic polarity, and the other is a phase change medium on which reversible phase change between a crystalline phase and an amorphous phase is used for recording and deleting data. The latter is characteristic in that it is capable of repetitive recording by a single beam and its disk drives have simpler optical mechanisms, and it has been applied to a recording medium in the fields related to computers and audio visual systems.

Information is written on and erased from a phase change optical recording medium by irradiating a laser light beam on a thin film of recording layer of the medium, thereby heating the recording layer so that its structure changes from a crystalline phase to an amorphous phase or vice versa, changing its reflectivity of the disk. Typically, the entire surface is crystalline in an initial state and data that are formed of amorphous marks and crystalline spaces are recorded onto the surface.

A typical method by which amorphous marks are made on a phase change disk is shown in FIG. 1. By modulating laser power to three values, writing power Pw, erasing power Pe, and bias power Pb (Pw>Pe>Pb), writing and erasure are carried out. In order to make marks, a pulse train of Pw and Pb pulses is irradiated. A Pw pulse melts the recording layer, after which the layer rapidly cools as the laser power is modulated to Pb, and the molten area becomes an amorphous phase. The laser power is then changed to Pe to crystallize the rear edge of the amorphous section and form a mark having a predetermined length. To conduct a repetitive recording, or overwrite, a so-called direct overwrite is possible. In the direct overwrite, a modulated laser beam is applied in the same manner on a track that is already recorded to form new marks at predetermined positions while crystallizing and deleting old amorphous marks that have been recorded simultaneously.

The simplest structure of a phase change optical recording medium has, on a transparent substrate, a first protective layer, a recording layer, a second protective layer, and a reflective layer disposed in this sequence, or in the opposite sequence, to which a laser beam is irradiated from the side of the first protective layer to record and reproduce data. Typically, a mixture of ZnS and $SiO_2$ is used for the first and second protective layers, a mixture of Ag, In, Ge, Sb, Te, and the like for the recording layer, and an Al alloy or an Ag alloy for the reflective layer. When an Ag alloy is used, a sulfuration preventive layer may be introduced between the second protective layer and the reflective layer. Although it may differ depending on the composition of the layers, an optical recording medium of such structure will deteriorate and cannot be used any further after several hundreds to several thousands of overwrites since jitter gradually increases as the medium is repeatedly overwritten.

It has been suggested, therefore, to use a material that includes $ZrO_2$ for a part or all of the protective layers, which are adjacent to the recording layer, to improve durability to repetitive recording. The suggestion is based on the recognition of excellent heat resistance and mechanical strength of $ZrO_2$. However, sufficient durability to repetitive recording cannot be achieved for a wide range of recording power only by incorporating a structure in which a material including $ZrO_2$ is adjacent to the recording layer. Particularly, it is not possible to reduce jitter to a satisfactory level when the recording power is low.

For example, in inventions disclosed in Japanese Patent Application Laid-Open (JP-A) No. 05-144085, JP-A No. 08-180458, JP-A No. 2000-348380, and JP-A No. 2000-182277, optical and thermal conditions are not optimized and therefore the inventions cannot be used to manufacture an optical recording medium durable to repetitive recording for a wide range of recording power.

In an invention disclosed in JP-A No. 11-339314, a layer including $ZrO_2$ is arranged adjacently to a recording layer, but the $ZrO_2$ layer is used only at the interface to a first protective layer.

An invention disclosed in JP-A No. 08-96411 describes an information-recording medium having a dielectric protective layer and a light-absorbing protective layer between a recording layer and a reflective layer. The object of the invention, however, is to manufacture an information-recording medium suitable for high-density recording by reducing the difference of light absorbance between an amorphous state and a crystalline state of the recording layer.

SUMMARY OF THE INVENTION

An object of the present invention is to provide a phase change optical recording medium having an excellent durability to repetitive recording and a wide recording power margin.

A phase change optical recording medium of the present invention comprises a substrate, a first protective layer, a recording layer, a second protective layer, a reflective layer wherein the layers are arranged in one of this sequence and the opposite sequence disposed on the substrate, and at least one of a first interface layer disposed between the first protective layer and the recording layer and a second interface layer disposed between the recording layer and the second protective layer, wherein at least one of the first interface layer and the second interface layer comprises an oxide of zirconium and at least one oxide of an element, excluding zirconium, selected from the group consisting of elements of period numbers 3 to 6 and group numbers 2 to 14 of the periodic table of the elements. By this configuration, the optical recording medium has a wide recording power margin and excellent durability to repetitive recording.

DESCRIPTION OF THE PREFERRED EMBODIMENTS

The present invention will be described in detail hereinafter.

The present invention provides a phase change optical recording medium comprising a first protective layer, a recording layer, a second protective layer, and a reflective layer disposed in this sequence or in the opposite sequence wherein a second interface layer is arranged between the recording layer and the second protective layer, the second interface layer comprising an oxide of zirconium and at least one oxide of an element, excluding zirconium, selected from the elements of period numbers 3 to 6 and of group numbers 2 to 14 of the periodic table of the elements. It should be appreciated that, throughout this specification, the notation of the "group number" is based on Nomenclature of Inorganic Chemistry: Recommendations 1990 (IUPAC).

With such structure, a phase change optical recording medium having a wide power margin and excellent durability to repetitive recording can be made.

Moreover, the structure may include a first interface layer between the first protective layer and the recording layer, the first interface layer comprising an oxide of zirconium and at least one oxide of an element, excluding zirconium, selected from the elements of period numbers 3 to 6 and of group numbers 2 to 14 of the periodic table of the elements. In addition, the composition of the oxides of the second interface layer and/or the first interface layer can be adjusted, and the layers other than the interface layers may be changed, for example by using a material having thermal conductivity of 10 W/(m·K) or less at least in bulk form for the second protective layer, in order to obtain an even better phase change optical recording medium.

To improve the repetitive recording durability, phase transitions between crystalline and amorphous phases must be fast and repeatedly done. When jitter increases after repeatedly overwriting a disk, a phenomenon can be observed in which the reflectivity of spaces between marks decrease. This is presumably caused by insufficient erasure, i.e. crystallization during repetitive recording and subsequent accumulation of low reflectivity portions, a part of which is not recrystallized to its initial state.

By incorporating a structure of the present invention, no decrease in reflectivity of spaces between marks and that of short marks are observed even after repetitive recording, and the increase of jitter can be suppressed. It is presumed that the layer containing an oxide of zirconium has an accelerating effect on nucleus formation and therefore it enhances crystallization at a relatively low temperature.

Figure 1:
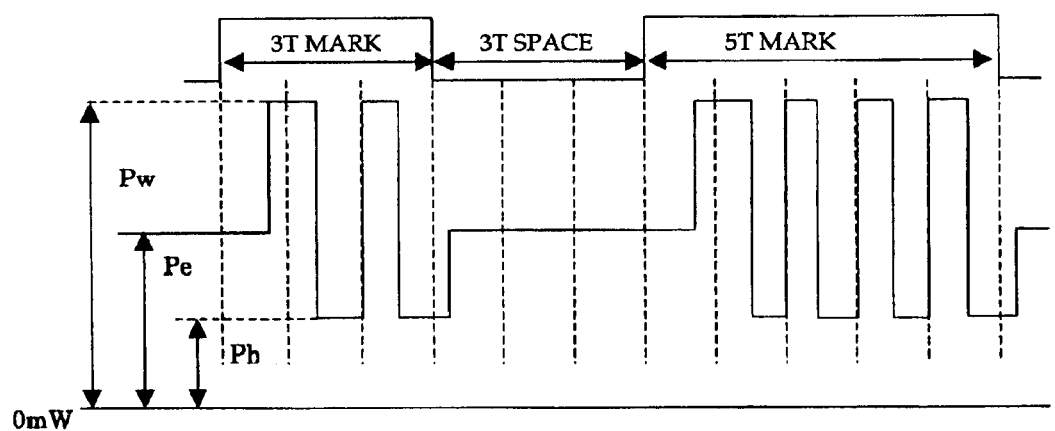
FIG. 1 is a schematic diagram showing a typical method to record amorphous marks on a phase change optical disk.
Figure 2:
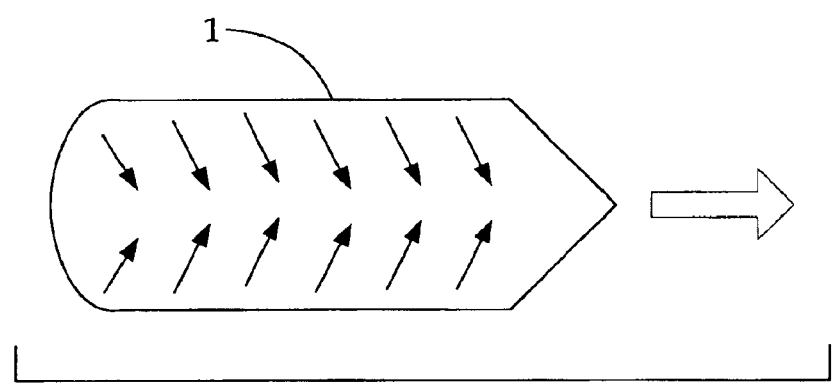
FIG. 2 is a schematic view of crystallization of an amorphous mark on which a laser beam is irradiated and crystal growth propagates from the interface of a crystalline phase.

Crystallization advances through two processes: nucleation and crystal growth. In a material containing an Sb—Te binary system as a base phase in which the ratio of Sb to Te is 3 to 1, almost no homogeneous nucleation occurs during writing and erasure, and crystallization of an amorphous portion advances through crystal growth of the interface between the amorphous portion and a crystal portion. FIG. 2 schematically shows how an amorphous mark crystallizes as it is being irradiated by a laser beam and crystal growth proceeds from the interface between the mark and a crystal portion. A laser beam (not shown) is irradiated on a surface of a recording layer. The region on which the laser beam is applied (not shown) moves toward the direction indicated by the open arrow. Crystallization of an amorphous mark 1 propagates from the edge thereof to the direction indicated by the solid arrows.

Figure 3:
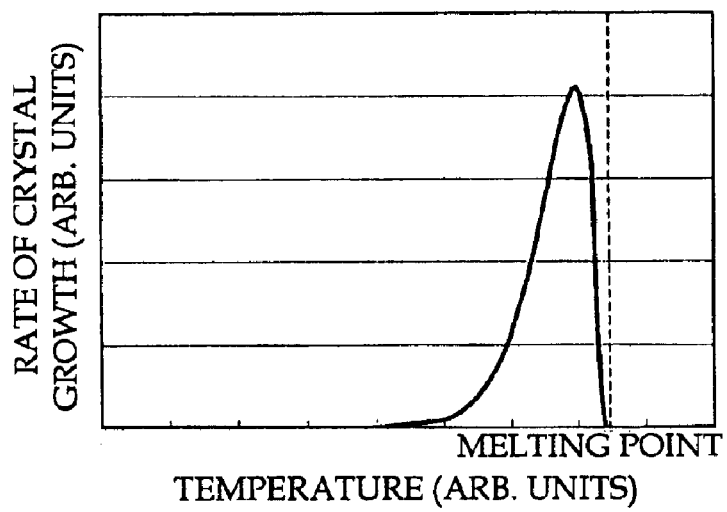
FIG. 3 is a schematic diagram of the relationship between temperature and the rate of crystal growth.

A relationship between temperature and the rate of crystal growth is shown in FIG. 3. As it one can see from FIG. 3, crystal growth advances fast only in a specific temperature range just below the melting point. Therefore, if the edge of a mark does not reach the temperature at which crystal growth can proceed quickly, the progress of crystal growth will be slow and therefore lead to insufficient erasure.

When a beam is irradiated on a mark, crystallization advances at a high rate from the edge of the mark if the area heated above the temperature at which crystal grows quickly is sufficiently larger than the width of the mark. However, if the area is about the same size as the width of the mark, not all the edge of the mark reach the temperature at which crystal growth is fast and some parts may be left unerased when the width of the mark is not uniform and a portion of it is wide, or when the tracking of the recording beam is a little off the center.

When the interface layer containing an oxide of zirconium is used, it is presumed that crystal nucleation is accelerated, forming nuclei in the inner part of the mark even if the temperature at the edge of the mark is relatively low and the crystal growth rate is not sufficiently fast. Therefore, crystallization proceeds, presumably, through crystal growth from the nuclei as well, leading to less formation of unerased portions, which result in improved durability to repetitive recording.

It is not known why nucleation is accelerated when the interface layer containing an oxide of zirconium is used.

However, the acceleration of nucleation can be confirmed by an observation of an experiment such as the one described here. An optical recording medium recorded with marks is rotated at a constant linear velocity and irradiated continuously at a power slightly above reading (reproducing) power. This anneals mark portions at about 100° C. to 200° C., by which crystal nuclei form in the inner portion of the marks and the marks are crystallized. By monitoring jitter while continuously irradiating at a power slightly above reading power, the crystallization process of the marks can be observed as an increase of the jitter.

An optical recording medium having a first protective layer, a recording layer, a second protective layer, and a reflective layer laminated in this order on a substrate is prepared as a standard layer structure. Another optical recording medium with a layer structure further including an interface layer of about 2 nm in thickness between the first protective layer and the recording layer is provided to compare the tendency of jitter increase. To compensate for the thickness of the added interface layer, the thickness of the first protective layer is reduced so that the optical characteristics including reflectivity are the same. The interface layer is inserted into the side facing the first protective layer instead of the second protective layer because if it is inserted into the side of the second protective layer, the interface layer will, even if its thickness is only about 2 nm, affect the temperature although the optical characteristics can be made the same. If the interface layer is inserted into the side of the first protective layer, the effect upon the temperature is very little so long as the optical characteristics are the same. Most of the heat absorbed by the recording layer dissipates to the side of the second protective layer where the reflective layer is deposited. Therefore, if the conditions of heat dissipation at the side of the second protective layer are different, the temperatures will be different and it will be impossible to compare the nucleation processes at the same temperature.

Figure 16:
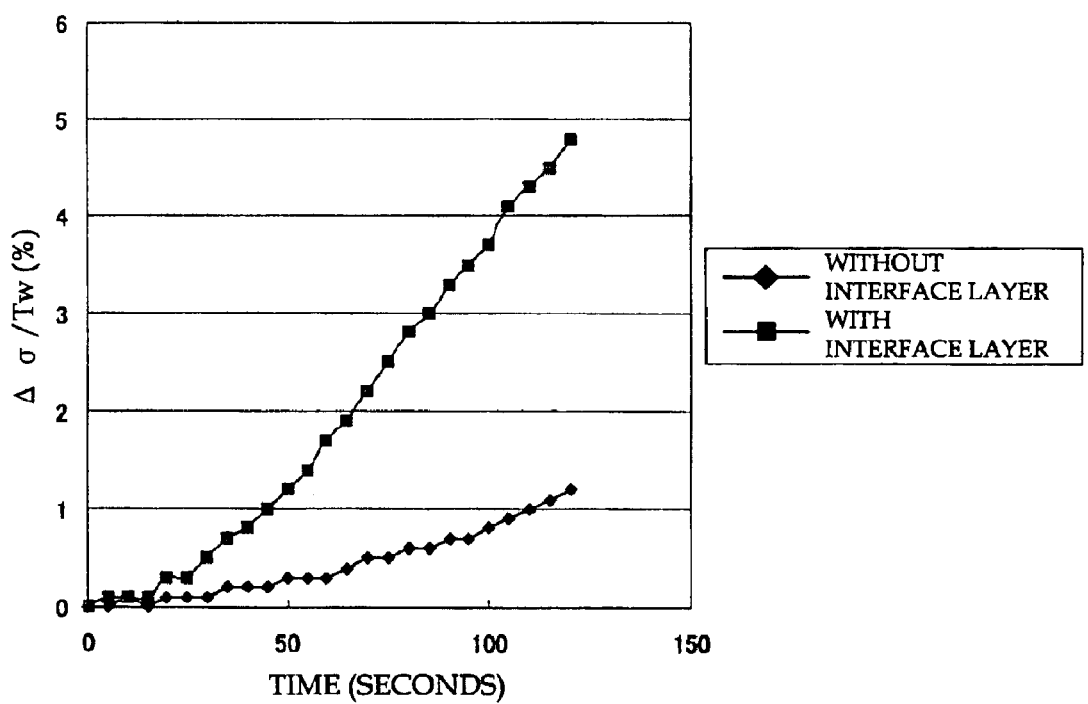
FIG. 16 is a diagram showing the comparison of jitter increase between a disk with an interface layer and a disk without one.

Such comparison is made and the tendencies of jitter increase are shown in FIG. 16. The irradiation power is 1.4 mW and linear velocity of rotation is 3.5 m/s. It can be seen from the figure that the jitter increases earlier for the medium with the interface layer, and acceleration of nucleation can be confirmed.

As described earlier, the heat generated in the recording layer upon the absorption of light mainly dissipates toward the reflective layer, allowing it to cool down. Accordingly, by placing an interface layer that has an accelerating effect on crystal nucleation on the side of the second protective layer, crystallization is effectively enhanced. In addition, by adding an interface layer to the side of the first protective layer, the crystallization is further accelerated, thus further improving the overwrite durability.

The most representative oxide of zirconium is $ZrO_2$. Its refractive index at wavelength of 660 nm is sufficiently high at about 2.2 and its absorbance is very low. Optically, it exhibits similar characteristics to a mixture of ZnS and $SiO_2$. Hence, one can think of a structure in which all of the second protective layer consists of a layer containing $ZrO_2$ instead of using the $ZrO_2$ layer only as the interface layer. However, incorporating this structure alone will lower the recording characteristics in the low-power range, as it will be shown as a comparative example later in this description. The reason for this is probably that the thermal conductivity of the $ZrO_2$-containing layer is greater than that of ZnS—$SiO_2$, and therefore the temperature of the recording layer does not rise. In order to compensate for the deficiency, the thickness of the layer containing $ZrO_2$ is increased, but it only results in worse jitter throughout the whole region. Hence, it is very difficult to achieve good characteristics for a wide range of power, only by adding a layer of a mixture containing $ZrO_2$ between the recording layer and the reflective layer.

Oxides, nitrides, and other substances having various thermal conductivities in bulk form as shown in Table 1 are used to form second protective layers, each of which between a second interface layer and a reflective layer, for observation. It is found that by using $SiO_2$ or ZnS—$SiO_2$ (80 mol % ZnS and 20 mol % $SiO_2$) for the second protective layer, recording characteristics in low-power range is not impaired. These materials have relatively low thermal conductivity, both below 10 W/(m·K). Although it is difficult to measure a thermal conductivity of a thin film, it is assumed that it reflects to some extent the characteristics of the thermal conductivity in a bulk form. However, it is of note that not all of the bulk thermal conductivity relationships can be applied, since in some case such as those using materials containing $ZrO_2$, the characteristics are not satisfactory although the bulk thermal conductivities are below 10 W/(m·K).

As described above, by using a structure having a recording layer and a reflective layer between which a layer containing $ZrO_2$ is formed adjacent to the recording layer and a second protective layer having a thermal conductivity of 10 W/(m·K) or less at least in a bulk form is deposited, a phase change optical recording medium having an excellent durability to repetitive recording in a wide range of power.

TABLE 1

| Material | Thermal conductivity [W/(m · K)] |
|---|---|
| $Al_2O_3$ | 26 |
| MgO | 42 |
| AlN | 320 |
| SiC | 45–270 |
| Si | 148 |
| CdS | 30 |
| ZnS | 27 |
| ($ZrO_2$—3% $Y_2O_3$) | 5.1 |
| ($ZrO_2$—3% $Y_2O_3$)$_{80}$ ($TiO_2$)$_{20}$ | 1.9 |
| (ZnS)$_{80}$ ($SiO_2$)$_{20}$ | 8.6 |
| $SiO_2$ | 1.5 |

(Note: Values for thermal conductivity are of bulk form, either derived from a literature or actually measured.)

Next, properties and compositions of oxides of zirconium and other oxides that is used in combination will be described.

It is known that $ZrO_2$, a representative oxide of zirconium, is monoclinic at room temperature, turns to tetragonal form at about 1,000° C., and further changes to cubic phase at 2370° C. The phase change at about 1000° C. is accompanied by a large volume change (4.0 to 7.4%), which may cause a film to peel off during recording due to the large change in volume. Moreover, it causes a sputtering target to crack during its formation. To overcome these issues, one or more oxides of elements selected from those having period number 3 to 6 and group number 2 and 3 in the periodic table of the elements that form low-valence number oxides is mixed with $ZrO_2$ forming a solid solution, thus obtaining a partially stabilized zirconia or stabilized zirconia. By doing so, cubic phase, which is the highest temperature phase of $ZrO_2$, can be present as a stable phase either partially or entirely, so that the large volume change by the phase change is avoided, and crack during target formation or peeling off of film of an optical recording medium can be prevented. Preferred examples of oxides of elements of period number 3 to 6 and group number 2 and 3 in the periodic table of the elements that is dissolved in $ZrO_2$ include MgO, CaO, $Sc_2O_3$, $Y_2O_3$, and $CeO_2$. The amount of oxides to be dissolved in $ZrO_2$ is different from one oxide to another, but is 2 to 15 mol % ($\alpha$=2 to 15 mol %) of $ZrO_2$ solid solution, and more preferably 3 to 10 mol %.

Additionally, an oxide of one or more elements of period number 3 to 6 and group number 2 to 14, or more preferably, an oxide of one or more elements of period number 3 to 6 and group number 2 to 5 and 12 to 14, may be mixed. Particularly preferred oxides are $TiO_2$, $SiO_2$, $Al_2O_3$, MgO, $Ta_2O_5$, and ZnO (here, MgO is separately mixed and is different from MgO that is dissolved in $ZrO_2$). This is done because the partially stabilized zirconia and stabilized zirconia that are formed by dissolving an appropriate amount of MgO, CaO, $Sc_2O_3$, $Y_2O_3$, or $CeO_2$ in $ZrO_2$, have a high accelerating effect on nucleation, which result in gaining crystallization effect during overwriting, but losing storage stability of amorphous marks in high temperatures about 80° C. By mixing $TiO_2$, $SiO_2$, $Al_2O_3$, MgO, $Ta_2O_5$, ZnO, or the like, it is advantageous in terms of storage stability although crystallization enhancing effect is reduced.

The amount of the oxides to be mixed is also related to storage stability of the recording layer itself.

In some cases, the storage stability of the recording layer is good and using a material of partially stabilized zirconia or stabilized zirconia that are formed by dissolving an appropriate amount of MgO, CaO, $Sc_2O_3$, $Y_2O_3$, or $CeO_2$ in $ZrO_2$ does not cause any problem. But in other cases in which the storage stability of the recording layer is not good enough, the oxides are mixed. However, if the mixing ratio exceeds 60 mol %, the crystallization enhancing effect of $ZrO_2$ becomes irrelevant and therefore the upper limit is 60 mol % ($\gamma$=0 to 60 mol %). More preferably, the mixing ratio is 10 to 40 mol %.

A sulfide of zirconium, ZnS, may further be mixed. The film formation rate of $ZrO_2$ is slow. Hence, when film thickness is desired to be large, the process will take too long and deformation of substrate may happen. Or, tact time will be longer and the cost will be higher. On the other hand, ZnS can be formed into a film at a rate more than ten times as much as that of $ZrO_2$, and the formation rate of $ZrO_2$ film can be increased by mixing ZnS. However, if the mixing ratio exceeds 60 mol %, the crystallization enhancing effect of $ZrO_2$ becomes irrelevant and therefore the upper limit is 60 mol % ($\delta$=0 to 60 mol %). More preferably, the mixing ratio is 20 mol % or less.

It should be noted that in order to utilize the characteristics of $ZrO_2$, either partially stabilized zirconia or stabilized zirconia that are formed by dissolving an appropriate amount of MgO, CaO, $Sc_2O_3$, $Y_2O_3$, or $CeO_2$ in $ZrO_2$ should be included in an amount of 40 mol % or more ($\beta$=40 to 100 mol %), and more preferably 60 mol % or more.

Therefore, it is preferred that one or both of the first interface layer and the second interface layer includes a mixture containing an oxide of zirconium that is represented by the following formula:

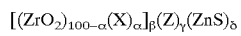
$[(ZrO_2)_{100-\alpha}(X)_\alpha]_\beta(Z)_\gamma(ZnS)_\delta$ wherein "X" represents at least one oxide selected from the group consisting of MgO, CaO, $Sc_2O_3$, $Y_2O_3$, and $CeO_2$; "Z" represents at least one oxide selected from the group consisting of $TiO_2$, $SiO_2$, $Al_2O_3$, MgO, $Ta_2O_5$, and ZnO; "$\alpha$" is 2 to 15 mol %; "$\beta$" is 40 to 100 mol %; "$\gamma$" is 0 to 60 mol %; "$\delta$" is 0 to 60 mol %; and $\beta$+$\gamma$+$\delta$=100 mol %.

The thickness of a first inter face layer and a second interface layer is preferably 1 nm or more, since its effect is irrelevant when the thickness is less than 1 nm. When the layer is used as a second interface layer, the upper limit of the thickness is preferably 18 nm, more preferably, the thickness is 2 to 14 nm. When the layer is thicker than this, and when the temperature of the recording layer is not high enough and compensated by the second protective layer, the total film thickness of the second interface layer and the second protective layer between the reflective layer and the recording layer becomes too large, and the reflectivity becomes too low. When used as a first interface layer, only the optical characteristics must be considered. However, if it is thicker than 100 nm, film formation efficiency is low and peeling off of film is likely to happen by the stress within the layer. The preferred thickness is, therefore, 100 nm or less, and more preferably 2 to 20 nm.

For the second protective layer, a material having thermal conductivity of 10 W/(m·K) or less at least in a bulk form is used as described above. Among those, a mixture of ZnS and $SiO_2$ has a strong effect to improve the recording characteristics in the low-power range. Since ZnS has a high refractive index n, it has a large optical adjusting effect. It additionally has an advantage of a high film formation rate. However, since its thermal conductivity is high, it has no effect on improving the recording characteristics in low-power range, if used alone. Accordingly, it is used in mixture with $SiO_2$, which has low thermal conductivity. By mixing 10 mol % or more of $SiO_2$, the effect on improving the recording characteristics in low-power range can be obtained. $SiO_2$, on the can be used alone ($\epsilon$=10 to 100 mol %). The refractive index n of $SiO_2$ is not as high as that of ZnS, but the thermal conductivity is low and therefore the effect on improving the recording characteristics in low-power range can be obtained. In addition, since it does not include sulfur, there is no need to form a sulfuration preventive layer between the second protective layer and the reflective layer even if Ag or an Ag alloy is used for the reflective layer.

By forming the second protective layer with a thickness of 2 nm or more, the effect on improving the recording characteristics in low-power range can be obtained. The upper limit is determined in accordance with the second interface layer. However, if the second protective layer is thicker than 20 nm, the rate of cooling becomes so low that good recording cannot be carried out especially when recorded at high linear velocity and the medium can easily deteriorate by irradiation of reading laser beam. The preferred thickness, therefore, is 20 nm or less.

Next, the recording layer will be described.

Here, a material containing Sb—Te binary system as a base phase in which the ratio of Sb to Te is about 3 to 1 will be described as a recording layer material. However, the description can be applied to a recording layer containing a mixture of GeTe—$Sb_2Te_3$ with a molar ratio of 2:1 as a base phase.

Crystallization during writing and erasure proceeds by crystal growth at the interface between a crystalline portion and an amorphous portion in the former case and by homogeneous nucleation within an amorphous portion in the latter case. In both cases, nucleation will be enhanced by using a material containing $ZrO_2$ as an interface layer, so that unerased portions are less likely to be formed and the durability to repetitive recording improves.

The Sb—Te binary system in which the ratio of Sb to Te is about 3 to 1 is a phases change recording material with excellent repetitive recording characteristics. By changing the mixing ratio of Sb and Te, it is possible to adjust the rate of crystallization: increasing the ratio of Sb will increase the rate of crystallization. According to the experiments conducted by the inventors of the present invention, when the ratio of Sb is 65 atomic % or more, recording is possible at a linear velocity of 1× of CD (1.2 m/s) or more. If the amount of Sb is less than that, the increase of jitter becomes large after repetitive recording even at 1.2 m/s and therefore effective recording is not possible. As the Sb ratio is increased, the rate of crystallization is consequently increased and effective recording can be done at a higher linear velocity. Due to the limitation of the evaluating device, the upper limit of linear velocity for effective recording is not determined, but repetitive recording is possible at least up to DVD 5× (17.5 m/s). However, if the content of Sb is above 85 atomic %, the crystallization rate increases rapidly and amorphous marks are hardly formed. It is therefore preferable that the ratio of Sb in a Sb—Te binary system is 65 atomic % to 85 atomic %.

However, the Sb—Te binary system alone is problematic in that the stability of amorphous phase is low. For example, under a high temperature environment of about 70° C. to 80° C., amorphous marks crystallize in 50 hours. Therefore, one or more elements that improve the stability of the amorphous phase are added to the binary system.

Ge is one of those additional elements and is quite effective. With only a small amount added, the element markedly improves the storage reliability. Improvement of amorphous phase stability can be expected with an added amount of 2 atomic % or more even for a recording layer having a high crystallization rate equivalent to or higher than DVD 2×. The more Ge is added, the higher the effect becomes. However, if the amount of the additive is too much, recording sensitivity and repetitive recording characteristics decrease, especially with a recording layer suitable for high linear velocity recording having high crystallization rate. Therefore, the preferred amount is 7 atomic % or less.

Moreover, by adding In or Ga, crystallization rate and crystallization temperature is increased, resulting in a better storage stability.

Ge is effective for improving storage stability as well, but reduces crystallization rate. Hence, in order to achieve a certain crystallization rate, the ratio of Sb must be raised as Ge is added. However, the recording sensitivity tends to decline as the SB ratio is increased.

On the other hand, the rate of crystallization can be raised without increasing the Sb ratio if In or Ga is added, and the recording layer can be made to have excellent recording sensitivity. When the added amount of In or Ga is less than 1 atomic %, the effect is irrelevant, and when it is more than 7 atomic %, repetitive recording characteristics and reading light stability is reduced. Therefore, the preferred amount is 1 to 7 atomic %.

Furthermore, elements such as Ag, Bi, C, Ca, Cr, Cu, Dy, Mg, Mn, Se, Si, and Sn may be added to adjust the rate of crystallization.

As described above, by using Ge, one of In and Ga, Sb, Te, and other optional elements in an appropriate combination, a recording layer having excellent repetitive recording characteristics, recording sensitivity, and storage stability for a desired recording linear velocity can be formed.

When the thickness of the recording layer is less than 8 nm, the modulation factor becomes too low and the stability of reflected light during reading is reduced. When it is more than 22 nm, the increase of jitter after repetitive recording is too large. Preferred range is therefore 8 to 22 nm.

Conventionally, an alloy having aluminum as its main component has been used for a reflective layer. Aluminum has a high reflectivity and thermal conductivity, and its stability over time is excellent when used in a disk. While Al alloys have frequently been used for reflective layers in conventional disks, it is sometimes difficult to record with considerable modulation in such disks when the crystallization rate of the recording layer material is high because recorded marks tend to be narrow. One of the reasons is that when the crystallization rate is high, a considerable part of the molten region crystallizes after it has been heated and therefore only a small amorphous region is formed.

One way to reduce the area of the recrystallizing region is to reduce the thickness of the second protective layer so that a rapid cooling structure can be made. However, by using a thinner second protective layer, the recording layer cannot be heated satisfactorily, resulting in a smaller molten region and thus the size of the amorphous region that is formed is small although the recrystallizing region may be smaller.

By using metals that have refractive indices smaller than that of aluminum for wavelength 650 to 670 nm, that is, if both "n" and "k" of the complex refractive index (n+ik) of a metal are smaller than those of aluminum, for the reflective layer, absorptivity of the recording layer will be higher and modulation can be made larger.

Metals that have both "n" and "k" lower than those of aluminum include Au, Ag, Cu, and alloys that contain these metals as their main component. Here, "main component" means that its content in an alloy is 90 atomic % or more, more preferably 95 atomic % or more.

Table 2 shows refractive indices of a sputtered film at 660 nm (measured) and thermal conductivities in a bulk form (from literature) for each of the pure metals mentioned above.

TABLE 2

|  | n | K | Thermal conductivity [W/(m · K)] |
| --- | --- | --- | --- |
| Au | 0.15 | 3.5 | 315 |
| Ag | 0.1 | 4.1 | 427 |
| Cu | 0.25 | 2.9 | 398 |
| Al | 1.3 | 6.5 | 237 |

It can be seen from Table 2 that all of Au, Ag, and Cu have higher thermal conductivity than aluminum. Thus, using these metals for a reflective layer will improve the photo absorptivity of the recording layer and raise the temperature of the recording layer so that the molten region will be larger. In addition, it will reduce the size of the recrystallizing region during cooling since it increases the rate of cooling. Therefore, it is possible to form a larger amorphous region than by using an aluminum alloy.

The modulation factor of a recorded mark is determined by the optical modulation factor and the size of the mark. The larger the optical modulation factor and the mark size are, the larger the modulation factor of the mark will be. Therefore, even when a material with high crystallization rate is used as a recording layer for high linear velocity recording, using the reflective layer as described above will enable to form a large recorded mark since its absorptivity is large and its cooling rate is high. Additionally, the difference of reflectivities between crystalline and amorphous phases is large and thus recording with high modulation factor is possible.

Among Au, Ag, Cu and alloys that contain these metals as their main component, Ag and Ag alloys are relatively low cost, and are less easily oxidized compared with Cu and Cu alloys, which are also low-priced. Therefore, Ag and Ag alloys can be used to form a medium that has excellent stability over time, and thus are preferable for a reflective layer. However, since they are easily sulfurized, a sulfurization preventive layer is required when a material containing sulfur is used in the second protective layer.

If the thickness of a sulfurization preventive layer is 3 nm or more, the layer, which is formed by sputtering, is substantially uniform and exhibits sulfurization preventive function. If the thickness is less than 3 nm, the probability of having a defect in a portion of the layer increases rapidly.

Requirements of the sulfurization preventive layer include no inclusion of sulfur and no permeation of sulfur.

Various oxide films, nitride films, and the like have been formed as sulfurization preventive layers, and recording characteristics and storage reliabilities have been evaluated. It has been found out that SiC, silicon, and materials containing at least one of these as their main component serve as excellent sulfurization preventive layers. Here, "main component" means that its content in a material is 90 mol % or more, more preferably 95 mol % or more.

If the thickness of a reflective layer is 90 nm or more, there will be almost no transmitted light and light can be used efficiently. Therefore, the thickness is preferably 90 nm or more. The larger the thickness is, the greater the cooling rate will be and therefore advantageous when using a recording layer having a high crystallization rate. However, the cooling rate saturates at 200 nm or less, and when the thickness is more than 200 nm, recording characteristics do not change by increasing the thickness and in addition, more time is required for film formation. Therefore, the thickness is preferably 200 nm or less.

The first protective layer has a role of adjusting the optical characteristics in addition to a role of heat resistant protective film. When its thickness is less than 40 nm, its heat resistance will be low and jitter increase after repetitive recording will be large. Therefore, the thickness should be 40 nm or more. If the thickness is more than 220 nm, the efficiency of film formation is low and peeling off of the film is more likely to happen due to the stress of the film. Therefore, the thickness is preferably in the range of 40 to 220 nm, more preferably 40 to 80 nm. The thickness is determined so that the reflectivity and modulation is large.

When a first interface layer is used, adjustments are made so that the total optical characteristics is satisfactory, for example, by reducing the thickness of the first protective layer by the thickness of the first interface layer.

The first protective layer can be formed using the same materials as those of the second protective layer.

The form, structure, size, and the like of the substrate are not limited, and can suitably be selected according to the purpose. The structure may be single layer or multi-layer. Examples of the substrates include a glass substrate, a quartz substrate, a silicon substrate, a polymer substrate such as a polyethylene terephthalate substrate, a polycarbonate substrate, a polystyrene substrate, and a polymethylmethacrylate substrate, and the like.

The thickness of the substrate is not limited, and can be selected according to the purpose. However, 0.59 mm to 0.62 mm is preferable for a DVD disk.

EXAMPLES

Examples and comparative examples will be shown hereinafter to specifically describe the present invention, but it should be appreciated that the present invention is not limited by these examples. For every example and comparative example, a polycarbonate disk substrate having a diameter of 12 cm and a thickness of 0.6 mm with guide grooves of 0.74 µm track pitch is used. On each disk substrate, a first protective layer, a first interface layer (optional), a recording layer, a second interface layer, a second protective layer, a sulfurization preventive layer, and a reflective layer are, in this sequence, formed by sputtering. Then, on the reflective layer, an organic protective layer is formed by spin coating, on which a polycarbonate disk having a diameter of 12 cm and a thickness of 0.6 mm is adhered. Next, each of the disks is initialized by crystallization using a laser diode to be used as a sample.

Evaluations are made by repetitive recording of random patterns with recording bit length of 0.267 µm/bit and eight-to-fourteen modulation (EFM) by irradiation of a laser beam of wavelength 660 nm and numerical aperture of 0.65 from the side of the substrate.

Example 1

On a disk, a film of (ZnS) 80 mol % (SiO$_2$) 20 mol % is formed as a first protective layer to a thickness of 65 nm, a film of Ag$_1$In$_3$Sb$_{72}$Te$_{20}$Ge$_4$ as a recording layer to a thickness of 15 nm, a film of a solid solution of an oxide of zirconium (ZrO$_2$-3 mol % Y$_2$O$_3$) 80 mol % and (TiO$_2$) 20 mol % as a second interface layer to a thickness of 2 nm, a film of (ZnS) 80 mol % (SiO$_2$) 20 mol % as a second protective layer to a thickness of 10 nm, a film of Si as a sulfurization preventive layer to a thickness of 4 nm, and a film of Ag as a reflective layer to a thickness of 140 nm. The disk is initialized by crystallization and then its repetitive recording characteristics are evaluated.

Figure 4:
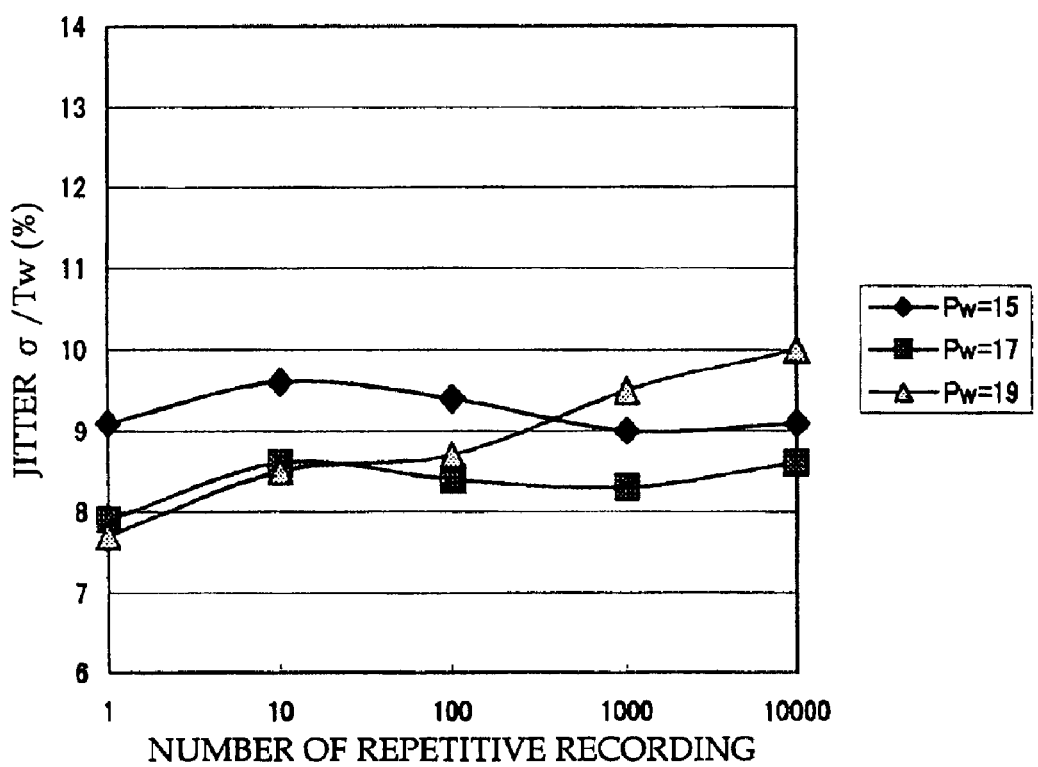
FIG. 4 is a diagram of jitter measurements of an optical recording medium of Example 1 to which 10,000 times of repetitive recording is conducted.

FIG. 4 shows jitter (data-to-clock jitter, no crosstalk) measurements for repetitive recording of 10,000 times at linear velocity of 14 m/s, Pw=15 mW, 17 mW, 19 mW, Pe=4.4 to 5.6 mW, and Pb=0.1 mW.

As it can be seen from the figure, jitter is less than 10% at all times, and an optical recording medium having an excellent durability to repetitive recording in a wade power range is made. No decrease in reflectivity by repetitive recording is observed.

Example 2

A disk is prepared in the same manner as Example 1 except that a film of a solid solution of an oxide of zirconium (ZrO$_2$-3 mol % Y$_2$O$_3$) 40 mol % and (TiO$_2$) 40 mol % and (SiO$_2$) 20 mol % is formed as the second interface layer to a thickness of 2 nm. Then, its repetitive recording characteristics are evaluated.

Figure 5:
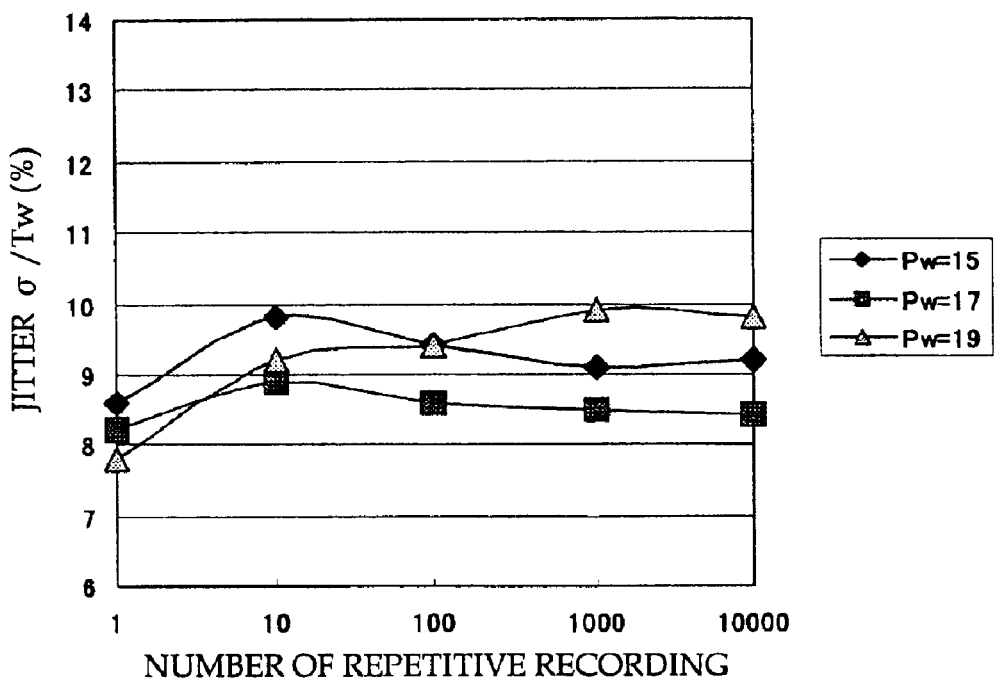
FIG. 5 is a diagram of jitter measurements of an optical recording medium of Example 2 to which 10,000 times of repetitive recording is conducted.

FIG. 5 shows jitter (data-to-clock jitter, no crosstalk) measurements for repetitive recording of 10,000 times at linear velocity of 14 m/s, Pw=15 mW, 17 mW, 19 mW, Pe=4.4 to 5.6 mW, and Pb=0.1 mW.

As it can be seen from the figure, jitter is less than 10% at all times, and an optical recording medium having an excellent durability to repetitive recording in a wade power range is made. No decrease in reflectivity by repetitive recording is observed.

Example 3

A disk is prepared in the same manner as Example 1 except that a film of Sb$_{76}$Te$_{20}$Ge$_4$ is formed as the recording layer to a thickness of 15 nm. Then, its repetitive recording characteristics are evaluated.

Figure 6:
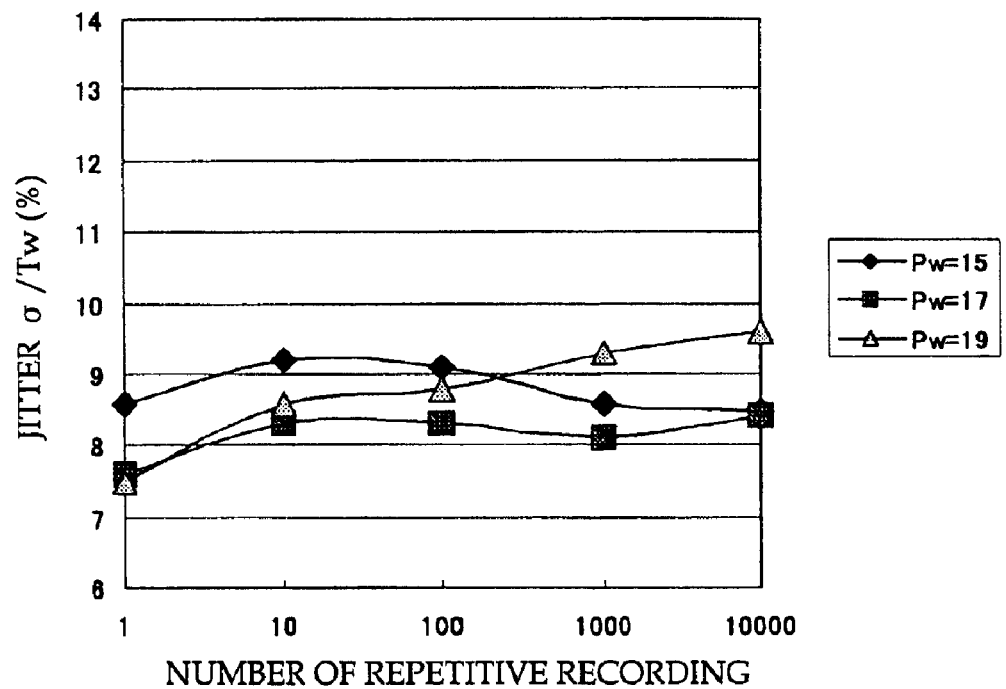
FIG. 6 is a diagram of jitter measurements of an optical recording medium of Example 3 to which 10,000 times of repetitive recording is conducted.

FIG. 6 shows jitter (data-to-clock jitter, no crosstalk) measurements for repetitive recording of 10,000 times at linear velocity of 14 m/s, Pw=15 mW, 17 mW, 19 mW, Pe=4.4 to 5.6 mW, and Pb=0.1 mW.

As it can be seen from the figure, jitter is less than 10% at all times, and an optical recording medium having an excellent durability to repetitive recording in a wade power range is made. No decrease in reflectivity by repetitive recording is observed.

Example 4

On a disk, a film of (ZnS) 80 mol % (SiO$_2$) 20 mol % is formed as a first protective layer to a thickness of 63 nm, a film of a solid solution of an oxide of zirconium (ZrO$_2$-3 mol % Y$_2$O$_3$) 40 mol % and (TiO$_2$) 40 mol % and (SiO$_2$) 20 mol % is formed as a first interface layer to a thickness of 2 nm, a film of Ag$_1$In$_3$Sb$_{72}$Te$_{20}$Ge$_4$ as a recording layer to a thickness of 15 nm, a film of a solid solution of an oxide of zirconium (ZrO$_2$-3 mol % Y$_2$O$_3$) 80 mol % and (TiO$_2$) 20 mol % as a second interface layer to a thickness of 2 nm, a film of (ZnS) 80 mol % (SiO$_2$) 20 mol % as a second protective layer to a thickness of 10 nm, a film of Si as a sulfurization preventive layer to a thickness of 4 nm, and a film of Ag as a reflective layer to a thickness of 140 nm. The disk is initialized by crystallization and then its repetitive recording characteristics are evaluated.

Figure 7:
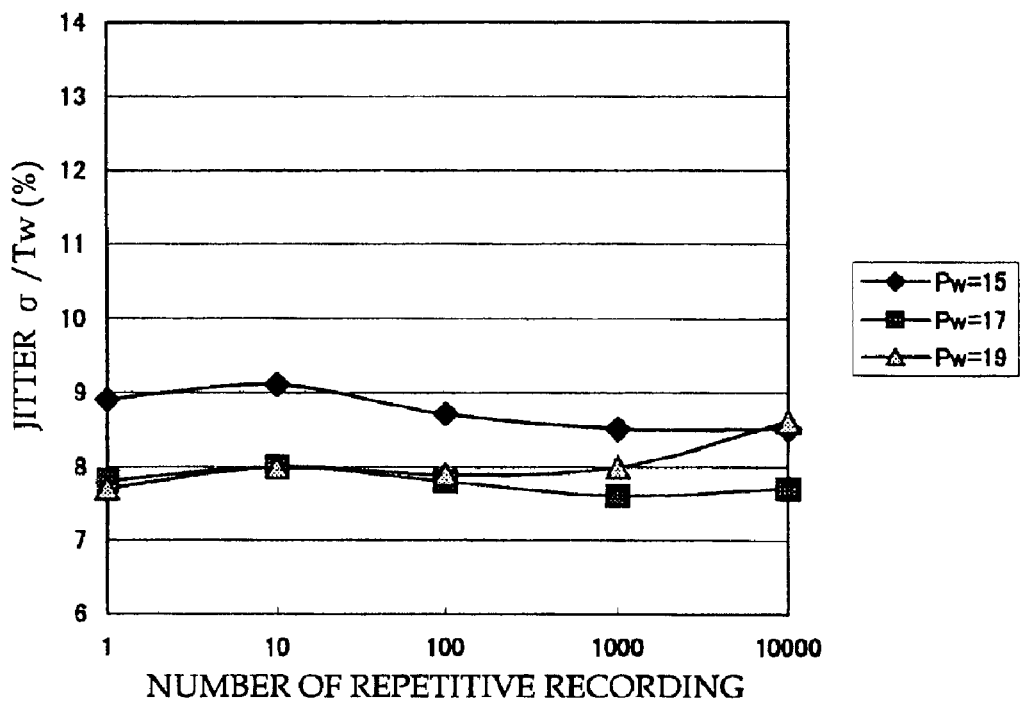
FIG. 7 is a diagram of jitter measurements of an optical recording medium of Example 4 to which 10,000 times of repetitive recording is conducted.

FIG. 7 shows jitter (data-to-clock jitter, no crosstalk) measurements for repetitive recording of 10,000 times at linear velocity of 14 m/s, Pw=15 mW, 17 mW, 19 mW, Pe=4.4 to 5.6 mW, and Pb=0.1 mW.

As it can be seen from the figure, jitter is less than 10% at all times, and an optical recording medium having an excellent durability to repetitive recording in a wade power range is made. No decrease in reflectivity by repetitive recording is observed.

Comparative Example 1

A disk is prepared in the same manner as Example 1 except that the second interface layer is not formed, and a film of (ZnS) 80 mol % (SiO$_2$) 20 mol % is formed as the second protective layer to a thickness of 12 nm. Then, its repetitive recording characteristics are evaluated.

Figure 8:
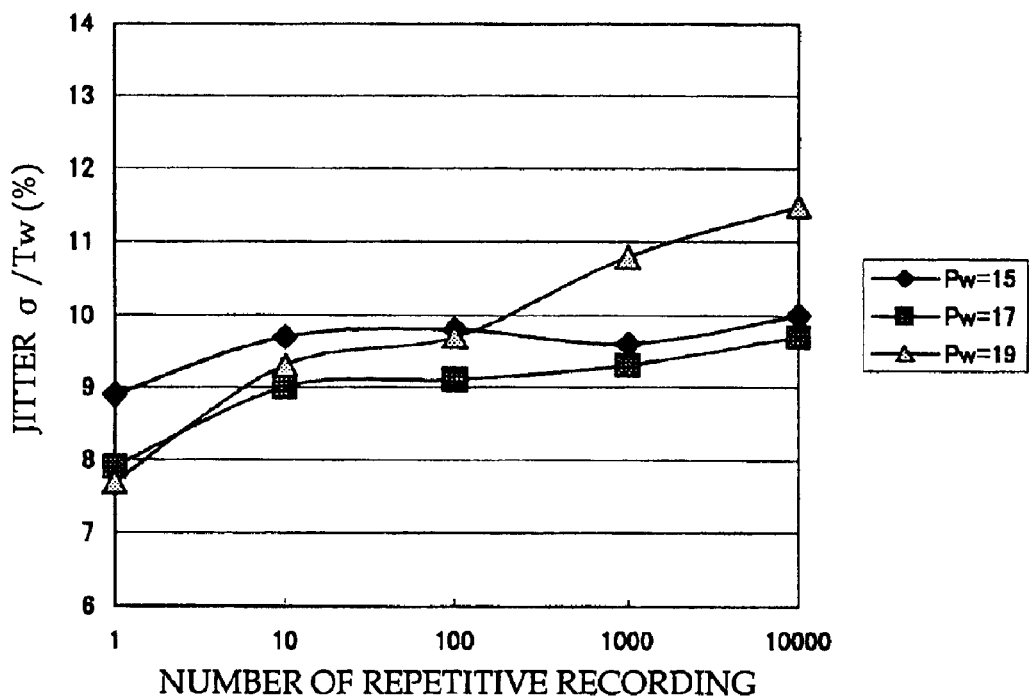
FIG. 8 is a diagram of jitter measurements of an optical recording medium of Comparative example 1 to which 10,000 times of repetitive recording is conducted.

FIG. 8 shows jitter (data-to-clock jitter, no crosstalk) measurements for repetitive recording of 10,000 times at linear velocity of 14 m/s, Pw=15 mW, 17 mW, 19 mW, Pe=4.4 to 5.6 mW, and Pb=0.1 mW.

As it can be seen from the figure, jitter is less than 10% up to 10,000 times of repetitive recording for Pw=15 mW and 17 mW, but it is more than 10% for Pw=19 mW after 100 times. Also, when Pw=19 mW, a decrease of about 1% in reflectivity due to repetitive recording is observed.

Example 5

A disk is prepared in the same manner as Example 1 except that a film of a solid solution of an oxide of zirconium (ZrO$_2$-3 mol % Y$_2$O$_3$) 80 mol % and (TiO$_2$) 20 mol % is formed as the second interface layer to a thickness of 14 nm and a film of (ZnS) 80 mol % (SiO$_2$) 20 mol % is formed as the second protective layer to a thickness of 6 nm. Then, its repetitive recording characteristics are evaluated.

Figure 9:
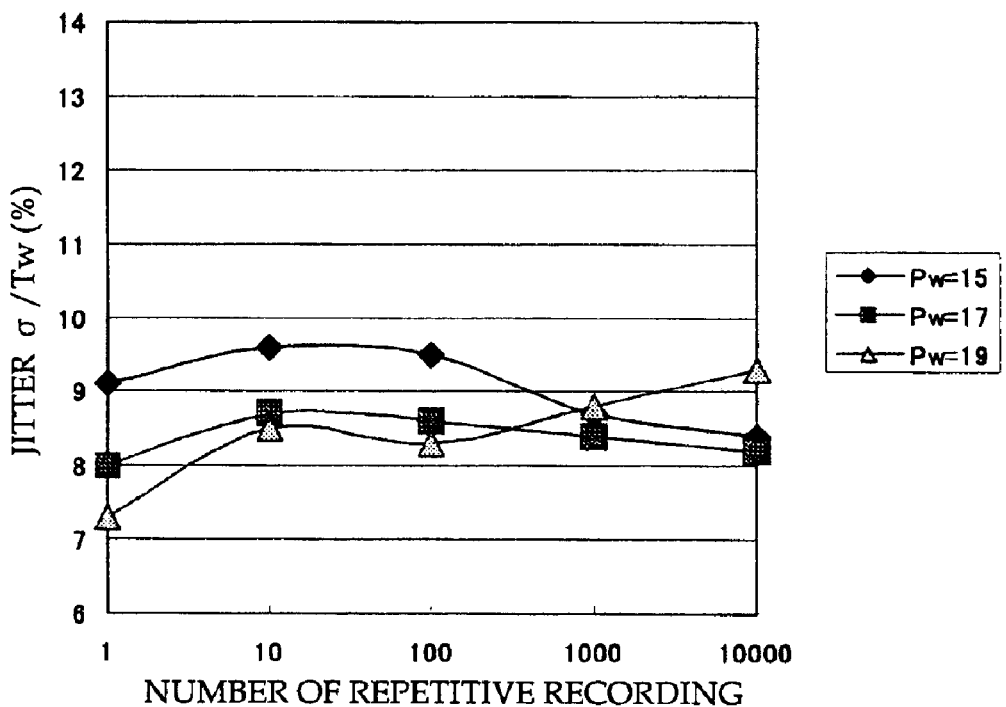
FIG. 9 is a diagram of jitter measurements of an optical recording medium of Example 5 to which 10,000 times of repetitive recording is conducted.

FIG. 9 shows jitter (data-to-clock jitter, no crosstalk) measurements for repetitive recording of 10,000 times at linear velocity of 14 m/s, Pw=15 mW, 17 mW, 19 mW, Pe=4.4 to 5.6 mW, and Pb=0.1 mW.

As it can be seen from the figure, jitter is less than 10% at all times, and an optical recording medium having an excellent durability to repetitive recording in a wade power range is made. No decrease in reflectivity by repetitive recording is observed.

Comparative Examples 2 and 3

On a disk of each comparative example, a film of (ZnS) 80 mol % (SiO$_2$) 20 mol % is formed as a first protective layer to a thickness of 65 nm, a film of Ag$_1$In$_3$Sb$_{72}$Te$_{20}$Ge$_4$ as a recording layer to a thickness of 15 nm, a film of a solid solution of an oxide of zirconium (ZrO$_2$-3 mol % Y$_2$O$_3$) 80 mol % and (TiO$_2$) 20 mol % as a second protective layer to a thickness of 16 nm (Comparative example 2) or 18 nm (Comparative example 3), and a film of Ag as a reflective layer to a thickness of 140 nm. The disks are initialized by crystallization and then their repetitive recording characteristics are evaluated.

Figure 10:
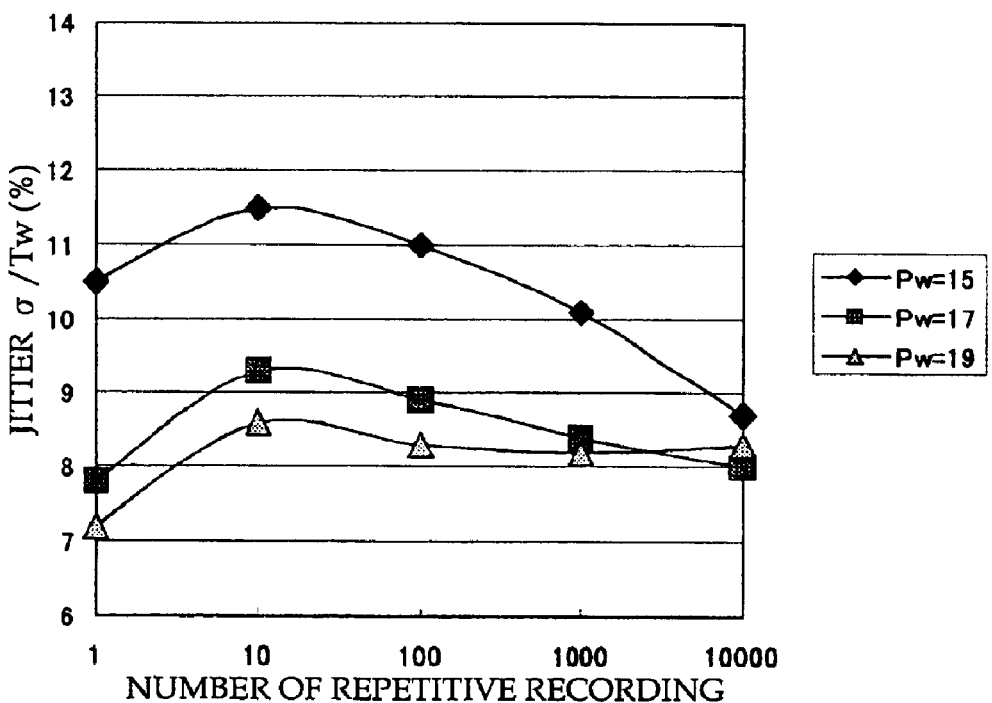
FIG. 10 is a diagram of jitter measurements of an optical recording medium of Comparative example 2 to which 10,000 times of repetitive recording is conducted.
Figure 11:
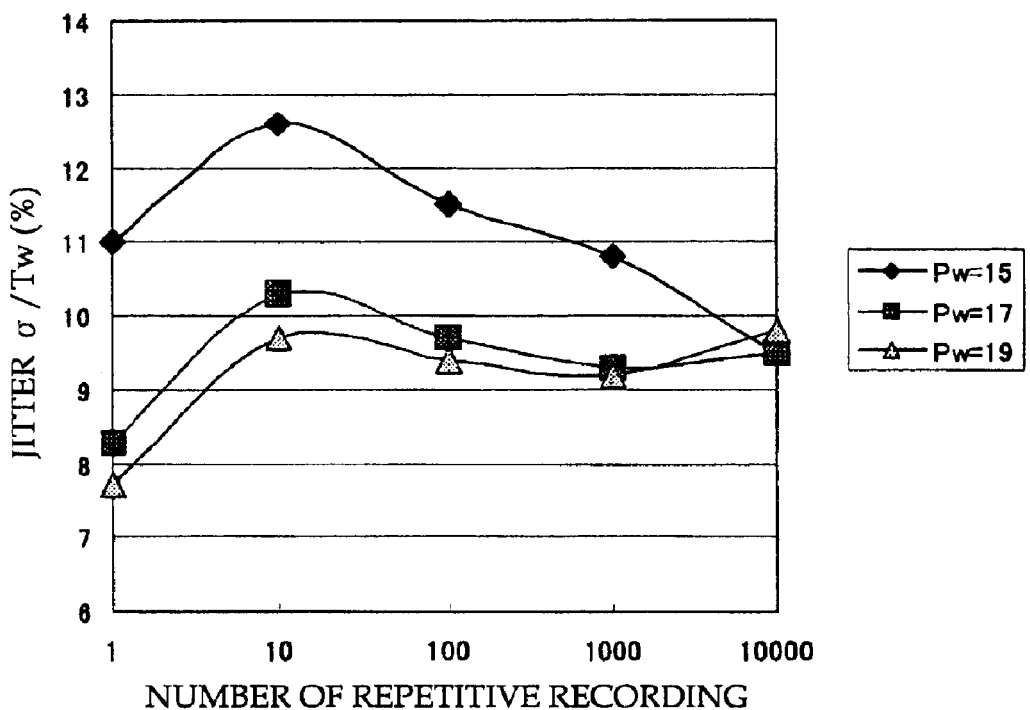
FIG. 11 is a diagram of jitter measurements of an optical recording medium of Comparative example 3 to which 10,000 times of repetitive recording is conducted.

FIGS. 10 and 11 show jitter (data-to-clock jitter, no crosstalk) measurements of the disk of Comparative example 2 and the disk of Comparative example 3, respectively, for repetitive recording of 10,000 times at linear velocity of 14 m/s, Pw=15 mW, 17 mW, 19 mW, Pe=4.4 to 5.6 mW, and Pb=0.1 mW.

As it can be seen from FIG. 10, in Comparative example 2, repetitive recording characteristics are fine for high power range of Pw=17 mW and 19 mW, but for Pw=15 mW, the characteristics are not good from the first time of repetitive recording.

Comparative example 3 is intended to improve the recording characteristics in the low-power range by increasing the thickness of the second protective layer to raise the temperature to which the recording layer is heated up. However, as it can be seen from FIG. 11, jitter is increased altogether and no improvement is observed for low-power range characteristics.

Example 6

A disk is prepared in the same manner as Example 1 except that a film of a solid solution of an oxide of zirconium (ZrO$_2$-3 mol % Y$_2$O$_3$) 80 mol % and (TiO$_2$) 20 mol % is formed as the second interface layer to a thickness of 6 nm and a film of SiO$_2$ is formed as the second protective layer to a thickness of 8 nm. Then, its repetitive recording characteristics are evaluated.

Figure 12:
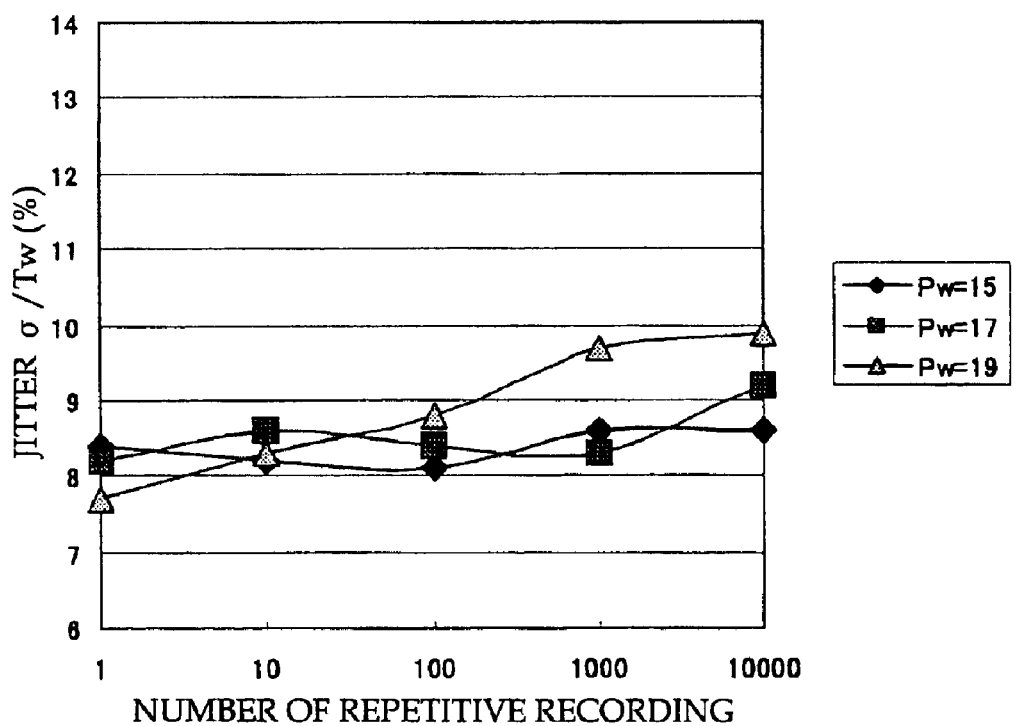
FIG. 12 is a diagram of jitter measurements of an optical recording medium of Example 6 to which 10,000 times of repetitive recording is conducted.

FIG. 12 shows jitter (data-to-clock jitter, no crosstalk) measurements for repetitive recording of 10,000 times at linear velocity of 14 m/s, Pw=15 mW, 17 mW, 19 mW, Pe=4.4 to 5.6 mW, and Pb=0.1 mW.

As it can be seen from the figure, jitter is less than 10% at all times, and an optical recording medium having an excellent durability to repetitive recording in a wade power range is made. No decrease in reflectivity by repetitive recording is observed.

Example 7

A disk is prepared in the same manner as Example 1 except that a film of a solid solution of an oxide of zirconium (ZrO$_2$-8 mol % MgO) 80 mol % and (TiO$_2$) 20 mol % is formed as the second interface layer to a thickness of 2 nm. Then, its repetitive recording characteristics are evaluated.

Figure 13:
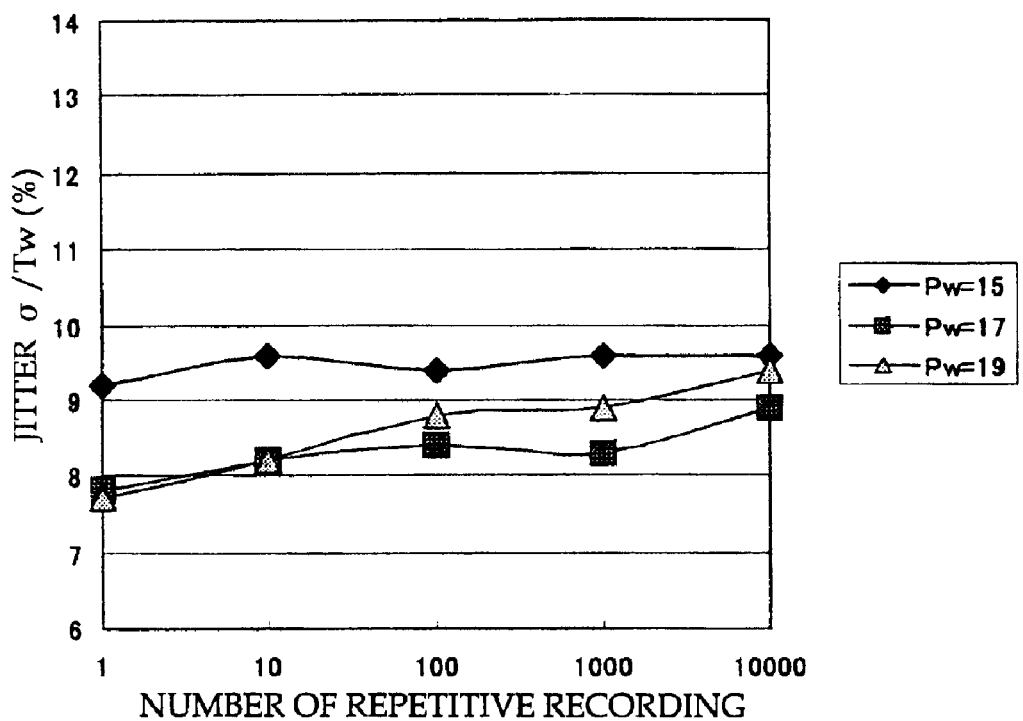
FIG. 13 is a diagram of jitter measurements of an optical recording medium of Example 7 to which 10,000 times of repetitive recording is conducted.

FIG. 13 shows jitter (data-to-clock jitter, no crosstalk) measurements for repetitive recording of 10,000 times at linear velocity of 14 m/s, Pw=15 mW, 17 mW, 19 mW, Pe=4.4 to 5.6 mW, and Pb=0.1 mW.

As it can be seen from the figure, jitter is less than 10% at all times, and an optical recording medium having an excellent durability to repetitive recording in a wade power range is made. No decrease in reflectivity by repetitive recording is observed.

Example 8

A disk is prepared in the same manner as Example 1 except that a film of a solid solution of an oxide of zirconium ($ZrO_2$-8 mol % MgO) 80 mol % and ($Al_2O_3$) 20 mol % is formed as the second interface layer to a thickness of 2 nm. Then, its repetitive recording characteristics are evaluated.

Figure 14:
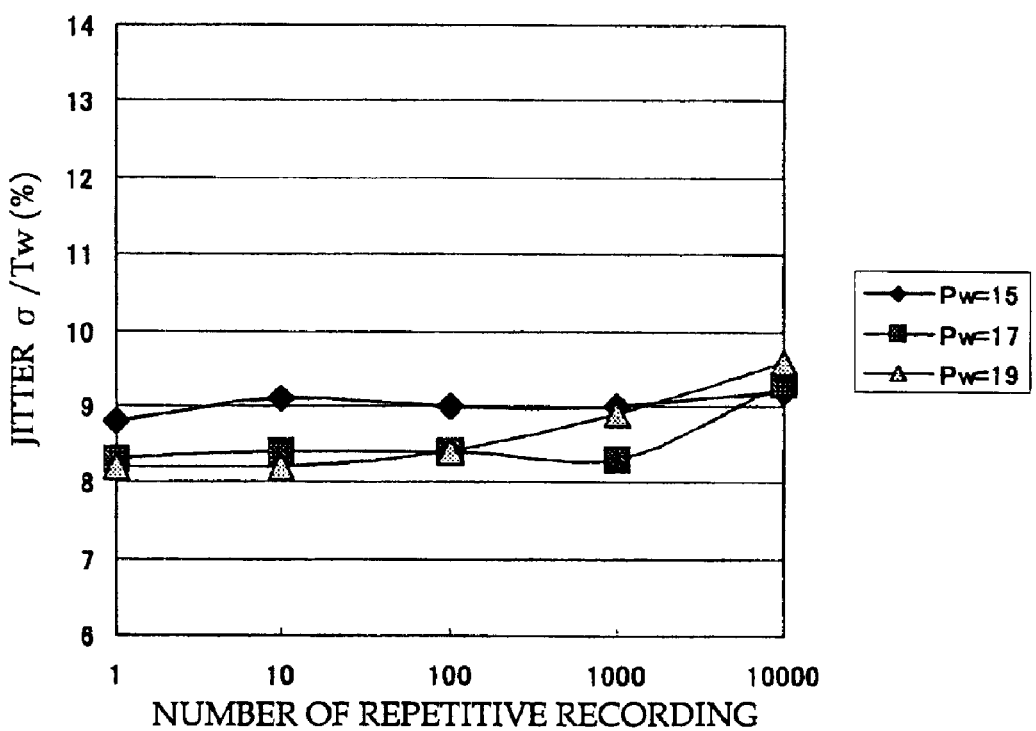
FIG. 14 is a diagram of jitter measurements of an optical recording medium of Example 8 to which 10,000 times of repetitive recording is conducted.

FIG. 14 shows jitter (data-to-clock jitter, no crosstalk) measurements for repetitive recording of 10,000 times at linear velocity of 14 m/s, Pw=15 mW, 17 mW, 19 mW, Pe=4.4 to 5.6 mW, and Pb=0.1 mW.

As it can be seen from the figure, jitter is less than 10% at all times, and an optical recording medium having an excellent durability to repetitive recording in a wade power range is made. No decrease in reflectivity by repetitive recording is observed.

Example 9

A disk is prepared in the same manner as Example 1 except that a film of a solid solution of an oxide of zirconium ($ZrO_2$-3 mol % $Y_2O_3$) 100 mol % is formed as the second interface layer to a thickness of 2 nm. Then, its repetitive recording characteristics are evaluated.

Figure 15:
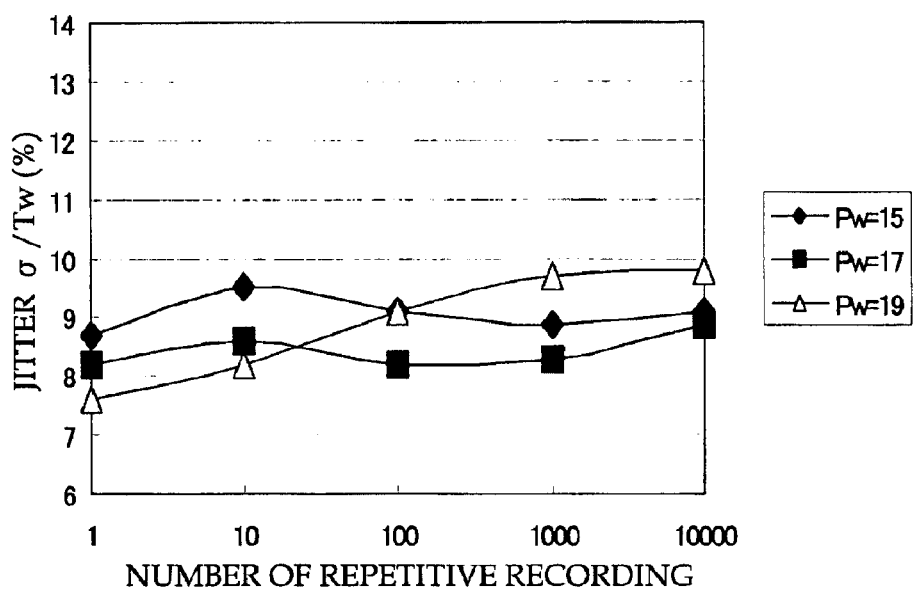
FIG. 15 is a diagram of jitter measurements of an optical recording medium of Example 9 to which 10,000 times of repetitive recording is conducted.

FIG. 15 shows jitter (data-to-clock jitter, no crosstalk) measurements for repetitive recording of 10,000 times at linear velocity of 14 m/s, Pw=15 mW, 17 mW, 19 mW, Pe=4.4 to 5.6 mW, and Pb=0.1 mW.

As it can be seen from the figure, jitter is less than 10% at all times, and an optical recording medium having an excellent durability to repetitive recording in a wade power range is made. No decrease in reflectivity by repetitive recording is observed.

Comparative Example 4

A disk is prepared in the same manner as Example 1 except that a film of ($ZrO_2$) 100 mol % is formed as the second interface layer to a thickness of 2 nm. Then, its repetitive recording characteristics are evaluated.

Since an oxide target of ($ZrO_2$) 100 mol % cracks during formation due to phase transition, a target consisting only of zirconium is used to form the film of ($ZrO_2$) 100 mol % by means of reactive sputtering (for Examples 1 to 9 and Comparative examples 1 to 3 mentioned above, oxide targets are used to form the films). However, the recording layer peels off of adjacent layers during recording and therefore it is impossible to evaluate the disk.

<Storage Stability>

Storage stabilities of the optical recording media of Examples 1 to 9 and Comparative examples 1 to 4 are evaluated by measuring the change of jitter and modulation of recorded marks after each medium is stored in a thermo-hygrostat tank at a temperature of 80° C. and humidity of 85% RH (relative humidity) for 300 hours. Results are shown in Table 3.

TABLE 3

| Optical recording medium | Storage stability |
|---|---|
| Example 1 | Very good |
| Example 2 | Very good |
| Example 3 | Very good |
| Example 4 | Very good |
| Example 5 | Very good |
| Example 6 | Very good |
| Example 7 | Very good |

TABLE 3-continued

| Optical recording medium | Storage stability |
|---|---|
| Example 8 | Very good |
| Example 9 | Poor |
| Comparative example 1 | Good |
| Comparative example 2 | Good |
| Comparative example 3 | Good |
| Comparative example 4 | Not available |

As described above, the present invention provides an optical recording medium having excellent durability to repetitive recording in a wide power range.

The present invention also provides an optical recording medium having good repetitive recording characteristics in a wide linear velocity range of at least from CD 1× (1.2 m/s) to DVD 5× (17.5 m/s) and good storage stability.

What is claimed is:

1. A phase change optical recording medium, comprising: a substrate; a first protective layer; a recording layer; a second protective layer; a reflective layer wherein the layers are arranged in one of this sequence and the opposite sequence disposed on the substrate; and a second interface layer disposed between the recording layer and the second protective layer wherein, the second interface layer comprises a solid solution of an at least partially stabilized oxide of zirconium and at least one oxide of an element, excluding zirconium, selected from the group consisting of elements of period numbers 3 to 6 and group numbers 2 to 14 of the periodic table of the elements.

2. A phase change optical recording medium according to claim 1, wherein the first protective layer, the recording layer, the second interface layer, the second protective layer, and the reflective layer are arranged in one of this sequence and the opposite sequence disposed on the substrate.

3. A phase change optical recording medium according to claim 1, wherein at least one oxide of an element excluding zirconium is an oxide of an element selected from the group consisting of elements of period numbers 3 to 6 and group numbers 2 and 3 of the periodic table of the elements.

4. A phase change optical recording medium according to claim 1, wherein the second interface layer comprises: an oxide of zirconium and at least one oxide of an element selected from the group consisting of elements of period numbers 3 to 6 and group numbers 2 and 3 of the periodic table of the elements; and at least one oxide of an element, excluding zirconium, selected from the group consisting of elements of period numbers 3 to 6 and group numbers 2 to 14 of the periodic table of the elements.

5. A phase change optical recording medium according to claim 1, wherein the oxide of zirconium is $ZrO_2$.

6. A phase change optical recording medium according to claim 1, wherein the oxide of an element, excluding zirconium, is selected from the group consisting of elements of period numbers 3 to 6 and group numbers 2 to 5 and 12 to 14 of the periodic table of the elements.

7. A phase change optical recording medium according to claim 1, wherein the second interface layer comprises a sulfide of zirconium.

8. A phase change optical recording medium according to claim 1, wherein the second interface layer comprises a mixture of a solid solution of an oxide of zirconium represented by the following formula:

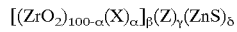

wherein "X" represents at least one oxide selected from the group consisting of MgO, CaO, $Sc_2O_3$, $Y_2O_3$, and $CeO_2$;

"Z" represents at least one oxide selected from the group consisting of $TiO_2$, $SiO_3$, $Al_2O_3$, $MgO$, $Ta_2O_5$, and $ZnO$; "α" is 2 to 15 mol %; "β" is 40 to 100 mol %; "γ" is 0 to 60 mol %; "δ" is 0 to 60 mol %; and β+γ+δ=100 mol %.

9. A phase change optical recording medium according to claim 1, wherein the second protective layer comprises a material having thermal conductivity of 10 W/(m·K) or less at least in bulk form.

10. A phase change optical recording medium according to claim 9, wherein the material having thermal conductivity of 10 W/(m·K) or less at least in bulk form is a mixture of ZnS and an oxide of silicon.

11. A phase change optical recording medium according to claim 10, wherein the mixture of ZnS and an oxide of silicon is represented by the following formula:

$$(ZnS)_{100-\epsilon}(SiO_2)_\epsilon$$

wherein "ε" is 10 to 100 mol %.

12. A phase change optical recording medium according to claim 1, wherein a thickness of the second protective layer is 2 to 20 nm.

13. A phase change optical recording medium according to claim 1, wherein the recording layer comprises Sb, Te, and Ge wherein a ratio of Sb to Te in number of atoms represented by the formula Sb/(Sb—Te) is 0.65 to 0.85.

14. A phase change optical recording medium according to claim 13, wherein an amount of Ge in the recording layer is 2 to 7 atomic %.

15. A phase change optical recording medium according to claim 13, wherein the recording layer further comprises one of In and Ga.

16. A phase change optical recording medium according to claim 15, wherein an amount of one of In and Ga is 1 to 7 atomic %.

17. A phase change optical recording medium according to claim 1, wherein a thickness of the recording layer is 8 to 22 nm.

18. A phase change optical recording medium according to claim 1, wherein the reflective layer comprises a metal selected from the group consisting of Au, Ag, Cu, and alloys containing 90 atomic % or more of one of Au, Ag, and Cu.

19. A phase change optical recording medium according to claim 1, wherein a thickness of the reflective layer is 90 to 200 nm.

20. A phase change optical recording medium according to claim 1, wherein the reflective layer comprises one of Ag and an Ag alloy, the optical recording medium further comprising a sulfurization preventive layer between the reflective layer and the second protective layer.

21. A phase change optical recording medium according to claim 20, wherein the sulfurization preventive layer comprises a substance selected from the group consisting of SiC, silicon, and materials containing 90 mol % or more of one of SiC, and silicon.

22. A phase change optical recording medium according to claim 1, wherein a thickness of the first protective layer is 40 to 200 nm.

23. A phase change optical recording medium according to claim 1, wherein the oxide of zirconium has the formula $Zr_xO_y$, and y are integers.

24. A phase change optical recording medium according to claim 1, wherein the oxide of zirconium has the formula $Zr_xO_y$, and x is less than or equal to y.

25. A phase change optical recording medium according to claim 24, wherein x is 1 or 2.

26. A phase change optical recording medium according to claim 1, further comprising a first interface layer disposed between the first protective layer and the recording layer, wherein the first interface layer comprises an oxide of zirconium and at least one oxide of an element, excluding zirconium, selected from the group consisting of element of period numbers 3 to 6 and group numbers 2 to 14 of the periodic table of the elements.

27. A phase change optical recording medium according to claim 26, wherein the first protective layer, the first interface layer, the recording layer, the second interface layer, the second protective layer, and the reflective layer are arranged in one of this sequence and the opposite sequence disposed on the substrate.

28. A phase change optical recording medium according to claim 26, wherein a thickness of the second interface layer is from 1 to 18 nm.

29. A phase change optical recording medium according to claim 28, wherein the thickness of the second interface layer is from 2 to 14 nm.

30. A phase change optical recording medium according to claim 26, wherein a thickness of the first interface layer is from 1 to 100 nm.

* * * * *